June 15, 1926.
H. A. HARDY
1,588,413
ICE CREAM DIPPER
Filed March 6, 1925
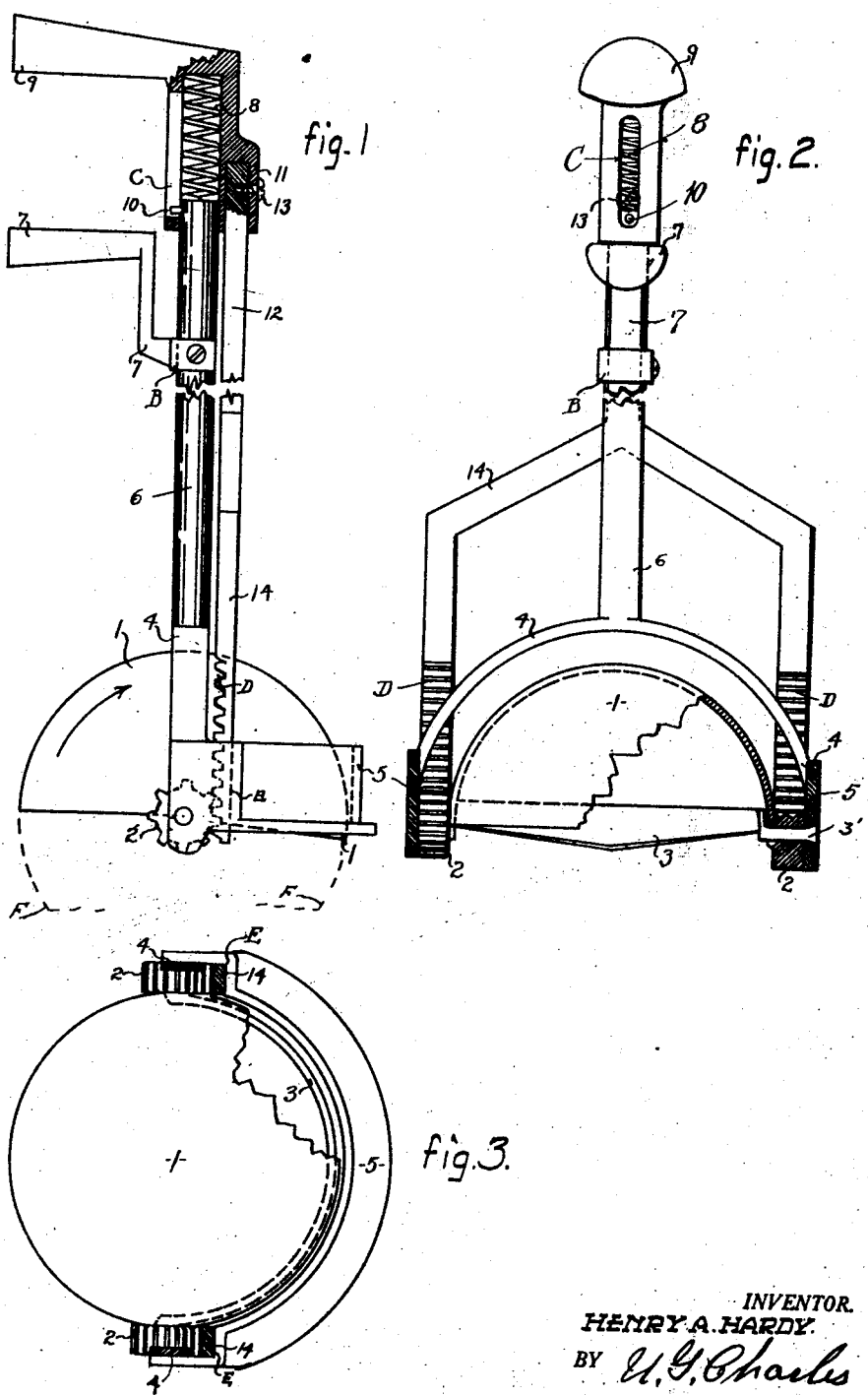
INVENTOR.
HENRY A. HARDY.
BY
ATTORNEYS.

Patented June 15, 1926.

1,588,413

UNITED STATES PATENT OFFICE.

HENRY A. HARDY, OF TOPEKA, KANSAS.

ICE-CREAM DIPPER.

Application filed March 6, 1925. Serial No. 13,451.

My invention relates to ice cream dippers, and has for its chief object a cup that will rotate automatically when the frame is forced against the surface of the ice cream. A still further object of my invention is to provide a dipper that will mechanically take and discharge the ice cream while the frame is in a vertical position, delivering a certain amount each time.

Referring to the drawings:

Fig. 1 is an elevation on the axis of the rotation of the dipper parts being removed for convenience of illustration.

Fig. 2 is an elevation taken at 90 degrees to the axis of revolution of the dipper.

Fig. 3 is a plan view of the cup with the supporting parts removed for illustration.

Referring to the drawing in detail, 1 indicates a hemispherical cup to which pinions 2 are firmly attached as shown. The pinions are trunnioned on supports 3'. The supports are integral with scrapers 3 and are secured at their ends to yoke 4. The stop 5 is integral with yoke 4 and functions as guiding means for the rack members hereinafter described.

Integral with yoke 4 is a rod 6, and positioned on said rod is a handle 7 attached by clamping as shown at B. The upper extremity of the rod 6 bears against a recoil spring 8, said spring being housed in the reciprocating handle 9. The said handle is slotted as shown at C, and functioning therein as guiding means is a pin 10 affixed in the rod 6 substantially as shown. The socket 11 is built integral with the handle 9 and adapted to receive the upper extremity of the push rod 12 which is firmly fastened therein by set screw 13. On the opposite end of push rod 12 is a yoke 14 integral with said rod and having teeth as at D functioning as racks slidably engaging in the stop 5 as shown at E. The teeth mesh with the pinions 2 and serve as means for rotating the cup in the direction indicated by the arrow.

The method of operation of this invention is as follows: The operator grips the handles 7 and 9 as shown in Figure 1 and presses the dipper against the surface of the ice cream. The reaction of the cream against the housing or stop 5 causes a downward movement of the handle 9 on the rod 6, and this downward movement causes a rotating movement of the cup 1 cutting it into the cream as shown by dotted line F. Said movement is limited by the handles 7 and 9 contacting, at which time the cup has passed through an arc of 180 degrees. In this position the cup being filled with cream, the handles 7 and 9 are held firmly together and the dipper is lifted. To discharge the contents, the handle 7 is released and the spring 8 causes a return of the cup to its initial position, and during the return of the cup the member 3 acts as a scraper on its interior surface, discharging the cream therefrom.

Such modifications may be employed as lie within the scope of the appended claims.

Having thus described my invention, what I claim as new and desire to secure by Letters Patent is:—

1. In ice cream dippers, a rod, a yoke and a stop, all being integral, a hemispherical cup functioning as a dipper, said cup trunnioned in said yoke, gears on the diametrical axis of said cup and rigidly attached thereto, a scraper engaging with the inside wall of said cup, means acting on said gears for rotating said cup for the purpose described.

2. In ice cream dippers, a rod having a yoke, on one end, a stop integral with said yoke, a circular scraper having both ends rigidly attached to said yoke, the ends of said scraper functioning as bearings, a hemispherical cup, gears mounted on the axis of said cup, and rigid thereto, and pivotedly engaging on said scraper bearings, a handle having a socket engaging on the end of said rod, a handle on said rod, a spring positioned in said socket as a rebound for said rod, a push rod attached to said handle, a yoke on the opposite end of said rod, ends of said yoke being parallel for a distance, and having teeth on one side thereof functioning as a rack engaging with said gear, a slot communicating with said socket, a pin in first said rod engaging in said slot so that said handles and rods will reciprocate for the rotation of said cup, substantially for the purpose described.

3. In ice cream dippers, a rod having a yoke and stop on one end, a handle attached near the opposite end of said rod, a cup rotatably mounted in said yoke, gears at the trunnioned points of said cup and rigidly fastened thereto, a push rod having a yoke on one end thereof, teeth on one side of both ends of said yoke, said teeth engaging with said gears, a handle attached to the opposite end of said push rod, a socket in the end of said handle, said socket adapted to receive the free end of first said rod, a spring in said socket for the separation of said handles, and return of said cup to its initial position, a slot in last said handle, said slot communicating with said socket, a pin near the end of first said rod, said pin engaging in said slot functioning as a stop, all for the purpose set forth and described.

HENRY A. HARDY.